Figure 1A:
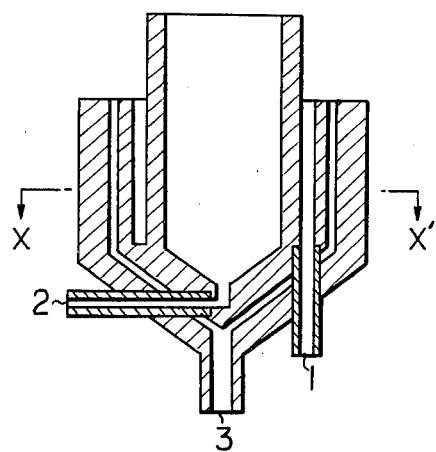

United States Patent [19]

Inoue et al.

[11] 4,144,299
[45] Mar. 13, 1979

[54] PROCESS FOR PRODUCING ACRYLONITRILE POLYMER FILM

[75] Inventors: Akio Inoue; Toshio Iwasa; Kiichiro Sasaguri; Toshihiko Amano; Junji Nomura, all of Fuji, Japan

[73] Assignee: Asahi Kasei Kogyo Kabushiki Kaisha, Osaka, Japan

[21] Appl. No.: 832,484

[22] Filed: Sep. 12, 1977

[51] Int. Cl.² .............................................. B29D 7/24
[52] U.S. Cl. .................................... 264/558; 264/561; 264/180; 264/182; 264/210 R; 264/233; 264/290 R
[58] Field of Search ............... 264/95, 89, 182, 210 R, 264/289, 290 R, 178 R, 233, 180–181

[56] References Cited

U.S. PATENT DOCUMENTS

| | | | |
|---|---|---|---|
| 3,418,406 | 12/1968 | Ball | 264/182 |
| 3,437,717 | 4/1969 | Isley et al. | 264/289 |
| 3,600,488 | 8/1971 | Yazawa | 264/95 |
| 3,904,334 | 9/1975 | Yazawa et al. | 264/95 |
| 4,066,731 | 1/1978 | Hungerford | 264/233 |

FOREIGN PATENT DOCUMENTS 50-142673 11/1975 Japan.

Primary Examiner—Jeffery R. Thurlow
Attorney, Agent, or Firm—Sprung, Felfe, Horn, Lynch & Kramer

[57] ABSTRACT

An acrylonitrile polymer film is produced by the steps of:

extruding an acrylonitrile polymer solution in a tubular shape into a coagulation liquid bath while a coagulation liquid is introduced into and withdrawn from the inside of the extruded tubular-shaped film;

removing the solvent remaining in the coagulated tubular film, and;

biaxially stretching the tubular film containing 5 to 23% by weight of water based on the dry weight, at a temperature of 100°–170° C. at least twice its original length both in the longitudinal and transverse directions by a tubular stretching procedure.

5 Claims, 4 Drawing Figures

PROCESS FOR PRODUCING ACRYLONITRILE POLYMER FILM

This invention relates to a process for producing an acrylonitrile polymer film. More particularly, it relates to a process for producing biaxially oriented acrylonitrile polymer film by a combination of a wet tubular extrusion-coagulation procedure and a tubular stretching procedure.

Biaxially oriented acrylonitrile polymer films attract attention in the field of packaging material, particularly for food and drugs, because they exhibit good gas barrier properties and cellophane-like transparency and stiffness. Many proposals have been heretofore made for the production of biaxially oriented acrylonitrile polymer films. For example, Japanese Patent Publication No. 13228/1960 discloses a process wherein an acrylonitrile polymer coalesced film formed by casting the polymer solution is biaxially stretched at a relatively low temperature, i.e. below about 70° C., in a state such that the film still contains a sizeable amount of the residual solvent, and then, the oriented film is heated at a temperature of below its thermal degradation temperature. However, the resultant film still contains some amounts of the residual solvent, and it is difficult to completely remove the residual solvent after the stretching because the film has a dense inner structure. This film is not satisfactory for use in packaging food and drugs from a hygienic standpoint. Furthermore, since it is difficult to obtain the desired degree of orientation in the stretching step and the orientation tends to be relaxed in the final heating step, the resultant film is not satisfactory in its gas barrier properly, staining resistance and mechanical properties.

The inventors already proposed, in Japanese Patent Laid-open Application No. 142,673/1975, a process for producing a biaxially oriented transparent acrylonitrile polymer film exhibiting improved gas barrier and mechanical properties, and substantially having no residual solvent. In this process, a residual solvent contained in a coagulated flat-shaped polymer film formed by a conventional wet film-forming procedure is substantially completely removed, and then, the film is biaxially stretched by using a tenter stretcher in the state that the film contains 5 to 50% by weight of water.

It now has been found that a transparent acrylonitrile polymer film possessing good gas barrier, weather-resistant, stain-resistant and mechanical properties, and substantially having no residual solvent, can be far more advantageously manufactured as compared with the process disclosed in Japanese Patent Publication No. 142673/1975.

In accordance with the present invention, there is provided a process for producing an acrylonitrile polymer film, which comprises the steps of:

extruding an acrylonitrile polymer solution in a tubular shape into a coagulation liquid bath while a coagulation liquid is introduced into and withdrawn from the inside of the extruded tubular-shaped film;

removing the solvent remaining in the coagulated tubular film, and;

biaxially stretching the tubular film containing 5 to 35% by weight of water based on the dry weight, at a temperature of 100°-170° C. by a tubular stretching procedure.

By the term "acrylonitrile polymer" used herein is meant a homopolymer or copolymer of acrylonitrile or its polyblend. The copolymer is comprised of at least 40% by weight, preferably of at least 65% by weight, of units derived from acrylonitrile and not more than 60% by weight, preferably of not more than 35% by weight, of units derived from other copolymerizable monoethylenically unsaturated monomer. Such copolymerizable monomers include, for example, acrylic acid esters such as methyl acrylate, ethyl acrylate, propyl acrylate, butyl acrylate, amyl acrylate, hexyl acrylate, phenyl acrylate and octyl acrylate; methacrylic acid esters such as methyl methacrylate, ethyl methacrylate, proply methacrylate, butyl methacrylate, amyl methacrylate, hexyl methacrylate, phenyl methacrylate and octyl methacrylate; vinyl or vinylidene halides such as vinyl chloride, vinyl bromide, vinyl fluoride, vinylidene chloride and vinylidene fluoride; vinyl or vinylidene group containing amides such as acrylic amide, methacrylic amide, N-methyl acrylic amide and N-vinylpyrrolidone; vinyl esters such as vinyl acetate, vinyl propionate and vinyl lactate; vinyl group containing aromatic compounds such as styrene and vinylnaphthalene; vinylpyridine; vinyl or vinylidene group containing carboxylic acids such as acrylic acid and methacrylic acid; unsaturated dicarboxylic acids such as itaconic acid, fumaric acid and maleic acid; unsaturated dicarboxylic acid anhydrides such as itaconic anhydride and maleic anhydride; allylsulfonic acid, methallylsulfonic acid and their esters and salts; and olefins such as ethylene and propylene. These copolymerizable monomers may be used alone or in combination. The acrylonitrile homopolymer or copolymer may be used either alone or as a polyblend in combination with each other or with other thermoplastic polymers. The latter polyblend should preferably comprise at least 40% by weight, based on the weight of the polyblend, of the acrylonitrile units. The content of acrylonitrile units in the above-mentioned acrylonitrile polymer is important for the desired weather-resistant and gas barrier properties of the film.

The acrylonitrile polymer used may be prepared by conventional polymerization procedures such as bulk, emulsion, suspension and solution polymerization procedures.

The acrylonitrile polymer used preferably possesses a reduced viscosity of from 0.5 to 1.5 as determined at 35° C. in a 0.2% by weight solution in dimethylformamide.

A solution of the acrylonitrile polymer solution is extruded through a ring slit die into a coagulation liquid bath while a coagulation liquid is introduced into and withdrawn from the inside of the extruded tubular-shaped film.

Figure 1B:
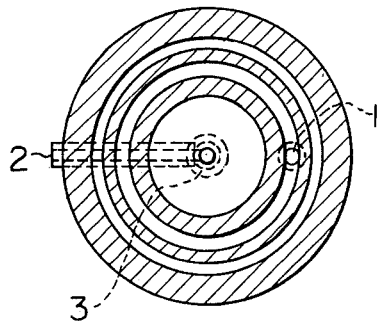

FIG. 1A shows the vertical cross section of one preferable ring slit die used for the extrusion, and FIG. 2A shows the horizontal cross section of the same ring slit die, cut along the line X-X' in FIG. 1. The polymer solution introduced in an inlet 3 of the ring slit die is extruded in a tubular shape. A coagulation liquid is introduced into the inside of the extruded tubular film through one of the pipes 1 and 2 and withdrawn therefrom through the other pipe, whereby the inner wall of the extruded tubular film is brought into contact with a coagulation liquid.

It is preferable that the coagulation liquid of the bath into which the polymer solution is extruded have substantially the same coagulating agent composition and temperature as those of the coagulating liquid which is introduced into the inside of the extruded tubular-shaped film.

A solvent used for the acrylonitrile polymer solution includes, for example, organic solvents such as dimethylformamide, dimethylacetamide, α-cyanoacetamide, acetonitrile, γ-butyrolactone, ethylene carbonate, N-methyl-β-cyanoethylformamide and dimethylsulfoxide, and concentrated aqueous solutions of inorganic compounds such as nitric acid, sulfuric acid, zinc chloride and sodium thiocyanate. The polymer solution in these solvents usually has a concentration of from 7 to 40% by weight, although the suitable concentration varies depending upon the solvent used. The polymer solution preferably has a temperature of from $-10°$ to $50°$ C.

The coagulation liquids used are preferably aqueous solutions containing at most 70% by weight of the solvent used for the polymer solution or other liquids. The temperature of the coagulation liquids may also be varied usually within the range of from $-10°$ C. to $50°$ C.

For the purpose of smoothly performing the biaxial stretching of the tubular film, the coagulation conditions or procedures employed should be such that the coagulated tubular film be of a uniform thickness. For example, it is preferable that the polymer solution be extruded upwardly, i.e., the extruded tubular film proceeds upwardly. By this procedure the distribution of the coagulation liquid concentration in the moving direction of the film is made uniform, and the coagulated film has a uniform thickness and smooth surface.

The coagulated polymer film is then subjected to treatment for the removal of the solvent remaining therein. This treatment may be carried out by washing the polymer film with water, and/or by heat-drying at below $100°$ C. the polymer film, optionally under a reduced pressure. Washing with water is preferable wherein both room temperature water and warm water may be used. The solvent removal treatment is carried out so that the residual solvent content in the film be below 20% by weight, preferably below 10% by weight, based on the weight of the dried film. When the residual solvent content is large, the final film is not hygienic, and also, is poor in gas barrier and weather-resistant properties.

The film should have a water content of from 5 to 35% by weight, preferably from 7% to 20% by weight, based on the weight of the dried film, at the time the film is subjected to the subsequent biaxial stretching. When the water content is outside this range, the inner pressure of the tubular film undesirably increases, which is liable to cause non-uniform stretching and bursting of the film. Further, when the water content is larger than the above-mentioned range, the stretched film tends to be opaque.

The adjustment of the water content in the film may be carried out as follows. When the solvent removal is carried out by washing with water, the wet film may be heat-dried at $50°$ to $150°$ C. by using a heated plate, roller or drum, or an hot-air oven, or by applying steam to the film. Particularly it is convenient to apply steam to the film because a dried film of uniform water content is easily obtained thereby. This steaming may be carried out alone or in combination with other heating means mentioned above. When the solvent removal is carried out by heating the coagulating film, the treated film usually has the desired water content, and therefore, an additional step of the water content adjustment may be omitted.

Figure 2:
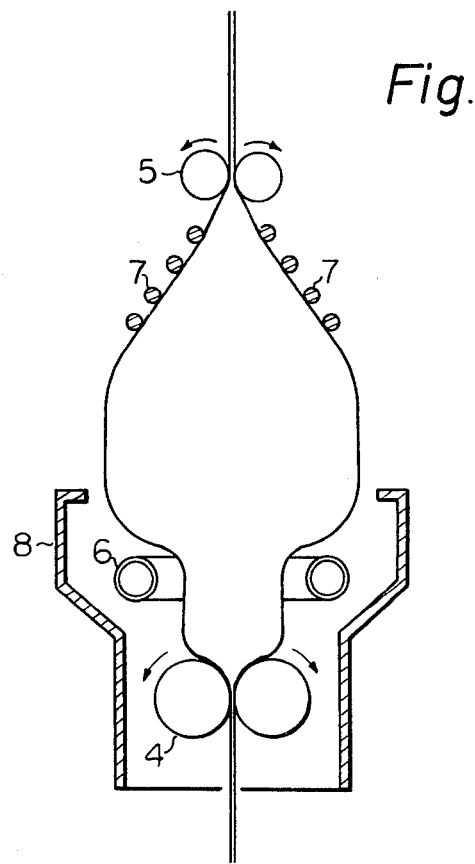
Figure 3:
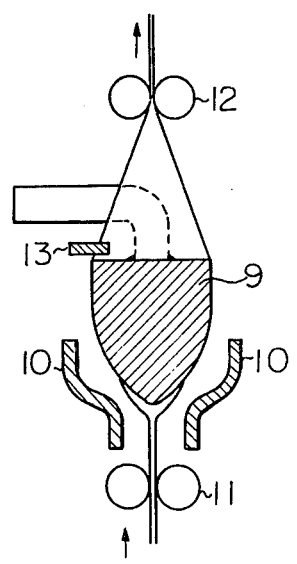

The film containing 5% to 35% by weight of water is biaxially stretched by a tubular stretching procedure. For example, the film may be stretched by so-called inflation procedures. That is, as shown in FIG. 2, the film is passed through a pair of feeding rollers 4 and a pair of delivery nip rollers 5, and air or another inert gas is enclosed inside the tubular film between the two pairs of rollers to produce a pneumatic inner pressure. The film is stretched in the longitudinal direction by the difference in peripheral speeds of the two pairs of rollers and in the transverse direction by the pneumatic inner pressure. In FIG. 2, reference numerals 6, 7 and 8 designate a heater, such as far-infrared heater, guide rollers and a hood, respectively. Instead of enclosing air or another inert gas inside the tubular film, the tubular film may be made to travel through a vacuum chamber where the film is inflated. The film may also be stretched by using a mechanical stretching means. That is, as shown in FIG. 3, the film is made to slide over the peripheral surface of a temperature-controlled metal mandrel 9 disposed between a pair of feeding nip rollers 11 and a pair of delivery nip rollers 12. In FIG. 3, reference numerals 10 and 13 designate a heater and a cutter blade. Instead of the mandrel shown in FIG. 3, guiding support rollers may be used, over which rollers the tubular film are made to slide. Further, the mechanical stretching means may be used in combination with the inflation procedure.

The film is stretched at least twice, preferably twice to five times its original length both in the longitudinal and transverse directions. When the stretching ratio is below twice the original length, the resultant film is poor in flexibility. A ratio of the stretching ratio in the longitudinal direction to the stretching ratio in the transverse direction should preferably be within the range of from 0.5 to 2.5, more preferably 0.7 to 1.5, for the purpose of preventing the film from bursting or breaking.

The optimum stretching temperature varies depending upon the composition and molecular weight of polymer, the thickness of film and the type of stretcher. For example the optimum stretching temperature increases with an increase of the acrylonitrile content in the polymer or of the molecular weight of the polymer. Usually, the stretching temperature is within the range of $100°$ to $170°$ C. When the temperature is below $100°$ C., the stretchability is poor and the film is liable to become white or opaque. When the temperature is above $170°$ C., the water content in the film is reduced and the stretchability and physical properties of the film are poor.

The biaxially oriented film may optionally be heat-set for the purpose of improving its dimensional stability and mechanical properties. The heat-setting may be carried out in a known manner, usually at a temperature higher than the stretching temperature and under tension. If desired, the biaxially stretched film may be subjected to a surface treatment such as antistatic agent coating and corona discharge.

The film manufactured by the process of the invention is useful as a packaging material, particularly for food and drugs. It is also useful as a laminating material for a polywood and a steel plate.

The invention will be further illustrated with reference to the following examples, in which part and % are by weight, unless otherwise specified, and the reduced viscosity of polymer means that as determined at $35°$ C. in a 0.2% by weight solution in dimethylformamide.

The oxygen transmission rate [in cc(mm)/m²·24 hr ·atm(STP)], and tensile strength and elongation were determined according to ASTM D1434 and D8828, respectively. The impact strength was determined according to ASTM D781, wherein an impact tester made by TOYO SEIKI MFG. CO. was used at 20° C. and at 65% RH, and the impact strength was expressed in terms of the impact strength of the film of 25 micron thickness.

EXAMPLE 1

Ten kg of a copolymer comprised of 94% acrylonitrile and 6% methyl acrylate, and having a reduced viscosity of 1.4, were dissolved in 30 liters of 70% nitric acid, followed by deaeration and filtration. The polymer dope so prepared was extruded into a 40% nitric acid coagulation bath at −5° C. by using a ring slit die similar to that shown in FIG. 1. The die had a circular slit of 35 mm diameter and a 0.8 mm clearance. A 40% nitric acid coagulation liquid was introduced into the extruded tubular film through an inlet pipe 1 and withdrawn from the tubular film through an outlet pipe 2, at a rate of 20 liters/min. The extrusion rate of the polymer dope was 440 ml/min. and the take-off speed of the tubular film was 6 m/min.

The tubular film, having a diameter of 42 mm and a thickness of 370 microns, was washed with water of room temperature until the residual nitric acid content in the film reached below 1,000 ppm. Then, the film having a water content of 240% was divided into nine parts. Each part was dried at 120° C. in a hot air dryer and then a drum dryer, until the water content reached the values shown in Table I below. Each tubular film was biaxially stretched repeatedly by using an inflation stretcher of the type shown in FIG. 2, which was composed of two pairs of rollers 4, 5, a far-infrared heater 6, guide roller 7 and a hood 8. The inner pressure inside the tubular film was maintained at about 0.2 atmospheric gauge pressure. The delivery speed of rollers 5 was 18 m/min. and the stretching ratio in the longitudinal direction was three times its original length.

The stretching conditions and the stretchability and other properties of the film are shown in Table I below.

film was prepared from the polymer dope in a manner similar to that in Example 1 wherein an aqueous 40% dimethylformamide solution was used as the coagulation liquid. The film was washed with warm water at 30° C. until the residual dimethylformamide content in the film reached 3%. Rubber plugs were inserted into both ends of the tubular film and tapes were tied around both the ends to seal them. One of the rubber plugs was provided with a pipe piercing it. The tubular film was hung in a thermostatic hot-air chamber maintained at 150° C., so that the pipe-provided plug was upward. After the tubular film was dried to a water content of 15%, a compressed air was introduced through the pipe into the tubular film whereby the film was inflated. The inner pressure inside the tube was 0.2 atmospheric gauge pressure.

The inflation stretching could be smoothly and uniformly carried out to obtain a film, the middle part of which was stretched 4.1 times its original length in the longitudinal direction and 2.9 times its original length in the transverse (peripheral) direction. The stretched film exhibited a good transparency, an impact strength of 8.8 kg-cm and an oxygen transmission rate of 0.02 cc(mm)/m²·24hr ·atm(STP). The residual dimethylformamide content in the film was below 0.2%.

For comparison purposes, two unstretched tubular films prepared by the same procedure as described above were dried to a water contents of 45% and 2%, respectively. Both dried films could not be smoothly stretched and burst. The burst films, particularly that stretched at the water content of 45%, were opaque.

EXAMPLE 3

Following the same procedure as described in Example 1, an unstretched tubular film having a water content of 15% was manufactured. The unstretched film was stretched at 150° C. by using a mandrel stretcher of the type shown in FIG. 3 which was composed of a temperature controlled metal spindle body 9 having a length of 15 cm and a maximum diameter of 12 cm, a far-infrared heater 10, two pairs of rollers 11, 12 and a cutting knife 13. The feeding speed of the rollers 11 and the delivery speed of the rollers 12 were 2 m/min. and 6 m/min., respectively.

Table I

| Run No. | Stretching conditions | | Stretchability and stretching ratio in transverse direction (times the original length) | Impact strength (kg ·cm) | Transparency | O₂ transmission rate |
|---|---|---|---|---|---|---|
| | Temperature (° C.) | Water content | | | | |
| 1 | 140 | 2 | Not stretched but burst | — | — | — |
| 2 | 140 | 7 | Uniformly stretched (2.5 times) | 8.6 | Good | 0.01 |
| 3 | 140 | 15 | Uniformly stretched (3.1 times) | 9.8 | Good | 0.01 |
| 4 | 140 | 30 | Uniformly stretched (about 2 times) | 7.8 | Good | 0.02 |
| 5 | 140 | 40 | Not stretched but burst | (2.1) | (Opaque) | — |
| 6 | 90 | 15 | Not stretched but burst | — | — | — |
| 7 | 110 | 15 | Uniformly stretched (2.7 times) | 7.9 | Good | 0.01 |
| 8 | 160 | 15 | Uniformly stretched (3.4 times) | 9.6 | Good | 0.01 |
| 9 | 180 | 15 | Burst (3 times) | 4.0 | Transparent but colored | 0.01 |

EXAMPLE 2

Six kg of a copolymer comprised of 85% acrylonitrile, 10% acrylic amide and 5% methyl acrylate, and having a reduced viscosity of 1.3, were dissolved in 14 liters of dimethylformamide, followed by deaeration and filtration, to prepare a film-forming dope. A tubular The stretched film was transparent and 17 microns in thickness and exhibited a cellophane-like stiffness. The impact strength was 7.9 kg-cm and the oxygen transmission rate was 0.01 cc(mm)/m²·24hr·atm(STP).

EXAMPLE 4

Ten kg of an acrylonitrile homopolymer having a reduced viscosity of 1.1 were dissolved in 35 liters of dimethylformamide, followed by deaeration and filtration. From the polymer dope so prepared, a biaxially stretched tubular film was manufactured by a procedure similar to that described in Example 1, wherein an aqueous 50% dimethylformamide solution of 25° C. was used as coagulation liquid. Further, the coagulated tubular film having a thickness of 350 microns was washed until the residual dimethylformamide content in the film reached below 10%. The film was then dried by applying thereto steam at 120° C. until the water content in the film reached 25%. The biaxial stretching of the film was carried out at 130° C.

The biaxially stretched tubular film was heat-set at 140° C. by using heated rollers. The resultant transparent film contained 3% of dimethylformamide therein and exhibited the following performances.

| | |
|---|---|
| Tensile strength (kg/mm$^2$) | |
| Longitudinal direction : | 18 |
| Transverse direction : | 14 |
| Tensile elongation | |
| Longitudinal direction : | 16 |
| Transverse direction : | 12 |
| Impact strength (kg-cm) : | 8.8 |
| O$_2$ transmission rate [cc(mm)/m$^2$ · 24hr · atm(STP)] : | 0.02 |

What we claim is:

1. A process for producing an acrylonitrile polymer film, which comprises the steps of:

extruding an acrylonitrile polymer solution in a tubular shape into a coagulation liquid bath while a coagulation liquid is introduced into and withdrawn from inside of the extruded tubular-shaped film, whereby said coagulation of the extruded tubular-shaped film proceeds simultaneously from both surfaces thereof;

removing the solvent remaining in the coagulated tubular film until the residual solvent content reaches below 20% by weight based on the weight of the dried film, and, simultaneously therewith or thereafter, maintaining the coagulated tubular film at a temperature of from 50° to 150° C. to adjust the water content in the tubular film to the range of from 5% to 35% by weight based on the weight of the dry film, and;

biaxially stretching the tubular film maintained in the state of containing 5 to 35% by weight of water based on the weight of the dry film, at a temperature of 100°–170° C. at least twice its original length both in the longitudinal and transverse directions by a tubular stretching procedure.

2. A process according to claim 1 wherein the coagulation liquid of the bath into which the polymer solution is extruded has substantially the same coagulating agent composition and temperature as those of the coagulating liquid which is introduced into the inside of the extruded tubular-shaped film.

3. A process according to claim 1 wherein the acrylonitrile polymer solution is extruded upwardly so that the extruded tubular-shaped film proceeds upwardly.

4. A process according to claim 1 wherein said maintenance of the coagulated tubular film at the temperature of from 50° to 150° C. is carried out by applying thereto steam alone or in combination with other heating means.

5. A process according to claim 1 wherein a ratio of the stretching ratio in the longitudinal direction to the stretching ratio in the transverse direction is within the range of from 0.5 to 2.5.

* * * * *